United States Patent
Ito et al.

(10) Patent No.: US 7,615,292 B2
(45) Date of Patent: *Nov. 10, 2009

(54) MAGNETIC RECORDING MEDIUM

(75) Inventors: Kuniyasu Ito, Tokyo (JP); Kazuhiro Hattori, Tokyo (JP)

(73) Assignee: TDK Corporation, Tokyo (JP)

( * ) Notice: Subject to any disclaimer, the term of this patent is extended or adjusted under 35 U.S.C. 154(b) by 472 days.

This patent is subject to a terminal disclaimer.

(21) Appl. No.: 11/082,865

(22) Filed: Mar. 18, 2005

(65) Prior Publication Data

US 2005/0214583 A1    Sep. 29, 2005

(30) Foreign Application Priority Data

Mar. 23, 2004 (JP) .............................. 2004-085527

(51) Int. Cl.
*G11B 5/65* (2006.01)
*G11B 5/71* (2006.01)
*B32B 17/08* (2006.01)

(52) U.S. Cl. .................. 428/831.2; 428/848.5; 360/135

(58) Field of Classification Search ................. 428/826, 428/836, 836.1, 848.5, 156; 427/548, 130; 216/22; 360/135
See application file for complete search history.

(56) References Cited

U.S. PATENT DOCUMENTS

| | | | |
|---|---|---|---|
| 5,766,718 A * | 6/1998 | Matsuda et al. .......... | 428/848.5 |
| 6,014,296 A | 1/2000 | Ichihara et al. | |
| 6,495,240 B1 * | 12/2002 | Wada et al. ................. | 428/156 |
| 6,665,145 B2 | 12/2003 | Wada | |
| 6,730,421 B1 * | 5/2004 | Kirino et al. ............. | 428/831.2 |
| 2005/0196650 A1 * | 9/2005 | Suwa et al. .............. | 428/848.5 |
| 2005/0199581 A1 * | 9/2005 | Suwa et al. .................... | 216/22 |

FOREIGN PATENT DOCUMENTS

| | | |
|---|---|---|
| JP | A-07-210863 | 8/1995 |
| JP | A-09-097419 | 4/1997 |
| JP | A-11-161943 | 6/1999 |
| JP | A-2000-195042 | 7/2000 |
| JP | A-2000-298822 | 10/2000 |
| WO | WO 00/68941 * | 5/2000 |

* cited by examiner

*Primary Examiner*—Kevin M. Bernatz
*Assistant Examiner*—Louis Falasco
(74) *Attorney, Agent, or Firm*—Oliff & Berridge, PLC

(57) ABSTRACT

A magnetic recording medium having a recording layer formed in a concavo-convex pattern, which can allow a head to have stable flying characteristics. The recording layer is formed in a concavo-convex pattern, and concave portions of the concavo-convex pattern of the recording layer are filled with a non-magnetic material. The relationship of $S \leq 3.6 \times R$ holds, when R represents a concavo-convex ratio obtained by dividing an area of convex portions in a surface by an area of the concave portions in the surface, and S represents a difference in height between a concavity and a convexity of the surface. In the magnetic recording medium, an arithmetical mean deviation of the assessed profile of the surface is limited to 0.3 nm or more.

4 Claims, 8 Drawing Sheets

MAGNETIC RECORDING MEDIUM

BACKGROUND OF THE INVENTION

1. Field of the Invention

The present invention relates to a magnetic recording medium which has a recording layer formed in a concavo-convex pattern.

2. Description of the Related Art

There has been a remarkable increase in areal density of magnetic recording media such as hard disks by various improvements including reduction in the grain size of magnetic particles forming the recording layer, material changes, and increased precision in the processing of magnetic heads, and a further improvement in the areal density is expected.

However, problems such as a limitation in the processing of magnetic heads, side fringes due to the spread of a magnetic field, and crosstalk have become pronounced, so that increase in the areal density by a conventional improvement method has reached its limitation. Thus, magnetic recording media such as discrete track media and patterned media have been proposed as a candidate for a magnetic recording medium which can realize further increase in the areal density (refer to, for example, Japanese Patent Laid-Open Publication No. Hei 9-97419). In such a magnetic recording medium, a recording layer is formed into a predetermined concavo-convex pattern.

Namely, since information is recorded on convex portions of the concavo-convex pattern, it is possible to restrain a side fringe, crosstalk, and the like between a convex portion and an adjacent convex portion. Forming the recording layer in a concavo-convex pattern also has the effect of preventing a magnetic head from being adsorbed onto the surface of the magnetic recording medium.

When concavities and convexities exist at the surface of the magnetic recoding medium, on the other hand, there are cases where stable flying characteristics of the head cannot be obtained.

To solve such a problem, it is conceivable that a non-magnetic material is deposited over the recording layer in a concavo-convex pattern for the purpose of filling concave portions with the non-magnetic material, followed by removing a surplus of the non-magnetic material above the recording layer to flatten the surface thereof.

A deposit technology such as sputtering, which is used in the field of semiconductor manufacturing, is available as a method for depositing a non-magnetic material. Also, a processing technology such as CMP (chemical mechanical polishing), which is used in the field of semiconductor manufacturing, is available as a method for removing a surplus non-magnetic material above the recording layer to flatten the surface.

The non-magnetic material, however, is deposited into a concavo-convex shape in accordance with the concave-convex shape of the recording layer. The deposited non-magnetic material is removed all over the surface during a flattening process, while concavities and convexities at the surface are gradually flattened. Thus, it is difficult to completely flatten the concavities and convexities, even if the non-magnetic material is removed up to the top face of the recording layer.

In the CMP method, it is difficult to precisely control the amount of processing (thickness) in the order of nanometers. Accordingly, there are cases where after the non-magnetic material above the recording layer is removed, a part of the recording layer is removed together with the non-magnetic material, and hence difference in the height of the surface contrarily increases because of difference between the processing rates of both.

In other words, it is difficult to completely flatten the surface, even if the non-magnetic material is deposited over the recording layer in the concavo-convex pattern to fill the concave portions with the non-magnetic material, and the surplus non-magnetic material above the recording layer is removed. A concavo-convex shape, to which the concavo-convex pattern of the recording layer is reflected, remains in the surface, and there are cases where stable flying characteristics of the head cannot be obtained due to such a concavo-convex shape.

SUMMARY OF THE INVENTION

In view of the foregoing problems, various exemplary embodiments of this invention provide a magnetic recording medium with a recording layer formed in a concavo-convex pattern which allows a magnetic head to have stable flying characteristics.

To solve the foregoing problems, according to various exemplary embodiments of the present invention, a concavo-convex ratio R obtained by dividing an area of convex portions in a surface by an area of concave portions in the surface, and a difference S in height between a concavity and a convexity of the surface satisfy a predetermined relationship. A magnetic recording and reproducing device the average flying height of a head of which is 10 nm or less has become the mainstream in recent years. To obtain favorable recording and reproducing characteristics in such a magnetic recording and reproducing device, it is considered that the fluctuation value in the flying height of the head should be limited to 3 nm at the maximum, due to the relationship of magnetic spacing loss. Generally in magnetic recording, if variation in reproduction output is ±1 dB or better, it is possible to favorably carry out recording and reproduction. Converting it to the fluctuation value in the flying height of the head, the desired fluctuation value is 3 nm or less.

In the process of reaching the present invention, this inventor found out that the smaller the concavo-convex ratio R, the larger the fluctuation value in the flying height of the head became. Also, the larger the difference S in height between a concavity and a convexity, the larger the fluctuation value in the flying height of the head became.

This is because an area of the head receiving a positive pressure is reduced with reduction in the concavo-convex ratio R (reduction in the ratio of the convex portion). Thus, air film stiffness between the magnetic recording medium and the head is reduced, and hence the fluctuation value in the flying height of the head is increased.

On the other hand, the larger the difference S in height between a concavity and a convexity, the lower the air film stiffness between the magnetic recording medium and the head becomes. Therefore, the fluctuation value in the flying height of the head is increased.

After further diligent study, the inventor found out from simulation that crash between the head and the surface of the magnetic recording medium could be prevented when the concavo-convex ratio R and the difference S in height between a concavity and a convexity of the surface satisfied the predetermined relationship, even if concavities and convexities at the surface were not completely flattened. Also, the inventor found out that it was possible to restrain the fluctuation value in the flying height of the head to 3 nm or less.

When the surface is excessively flat, the head tends to be adsorbed onto the surface of the magnetic recording medium.

Therefore, it is preferable that the arithmetical mean deviation of the assessed profile of the surface should be 0.3 nm or more.

That is, the present invention described below allows the aforementioned objects to be achieved.

(1) A magnetic recording medium comprising a substrate, and a recording layer formed in a predetermined concavo-convex pattern over the substrate, wherein the magnetic recording medium satisfies the relationship of S≦15.7×R+ 5.7, R representing a concavo-convex ratio obtained by dividing an area of convex portions in a surface by an area of concave portions in the surface, S representing a difference in height between a concavity and a convexity of the surface.

(2) The magnetic recording medium according to (1), satisfying the relationship of S≦3.6×R.

(3) The magnetic recording medium according to (1) or (2), wherein an arithmetical mean deviation of the assessed profile of the surface is limited to 0.3 nm or more.

(4) The magnetic recording medium according to one of (1) to (3), wherein the recording layer forms only convex portions of the concavo-convex pattern.

(5) The magnetic recording medium according to one of (1) to (4), wherein concave portions of the concavo-convex pattern of the recording layer are filled with a non-magnetic material.

(6) The magnetic recording medium according to (5), wherein the surface of the recording layer protrudes from the surface of the non-magnetic material in a direction of thickness.

(7) The magnetic recording medium according to (5) or (6), wherein the non-magnetic material is one selected from the group consisting of an oxide, a nitride, and a carbide.

(8) The magnetic recording medium according to (5) to (7), wherein the non-magnetic material is one selected from the group consisting of a material having an amorphous structure and a material in a microcrystalline state.

(9) The magnetic recording medium according to one of (5) to (8), wherein
the non-magnetic material chiefly comprises $SiO_2$.

The phrase "a magnetic recording medium in which a recording layer is formed in a predetermined concavo-convex pattern" used herein refers not only to a magnetic recording medium which has a recording layer divided into a number of recording elements, but also to a magnetic recording medium in which a recording layer is partly divided so as to have continue part, a magnetic recording medium in which a recording layer is continuously formed over part of a substrate like a recording layer in a spiral shape, and a magnetic recording medium having a continuous recording layer in which both of convex portions and concave portions are formed.

The term "magnetic recording medium" used herein should be understood to include a magneto-optical recording medium such as an MO (magnet optical) which uses both of magnetism and light, and a thermal assisted recording medium using both of magnetism and heat, in addition to a hard disk, a floppy disk (registered trademark), a magnetic tape, and the like which use only magnetism for recording and reading information.

In this application, a difference S in height between a concavity and a convexity of a surface is expressed in the unit of nm.

The term "arithmetical mean deviation of the assessed profile" used herein should be understood as an arithmetical mean deviation of the assessed profile defined in accordance with JIS-B0601-2001. The arithmetical mean deviation of the assessed profile, being an average of absolute values of deviations from a center line of a roughness curve, is expressed by the following equation:

$$Ra = \frac{1}{l} \int_0^l |f(x)| dx$$

where f(x) represents the roughness curve, and l represents the measured length of the roughness curve.

The phrase "convex portions of a concavo-convex pattern" used herein should be understood as protruding portions of a concavo-convex shape in a cross section orthogonal to the surface.

The phrase "a material in a microcrystalline state" used herein should be understood as a material which does not have a crystalline peak in X-ray diffraction.

According to the present invention, since the flying characteristics of a head become stable, it is possible to obtain favorable recording and reproducing characteristics. It is also possible to prevent the adsorption of the head.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
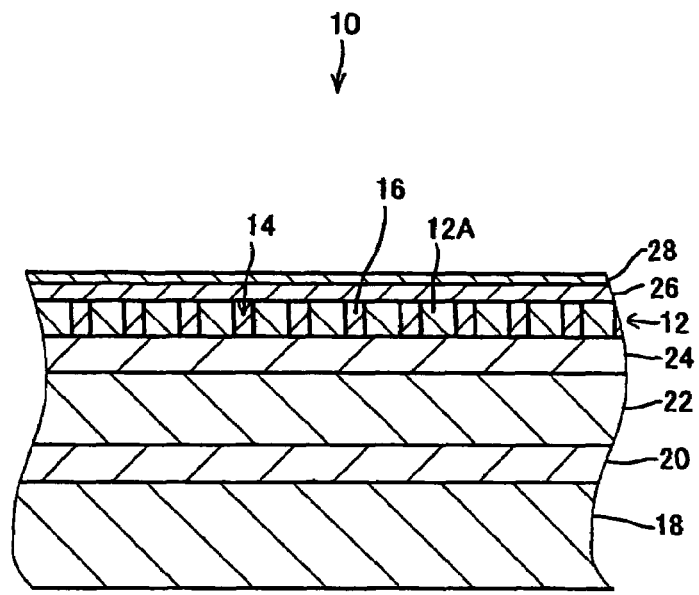
FIG. 1 is a schematic cross-sectional side view showing the structure of a magnetic recording medium according to a first exemplary embodiment of the present invention.
Figure 2:
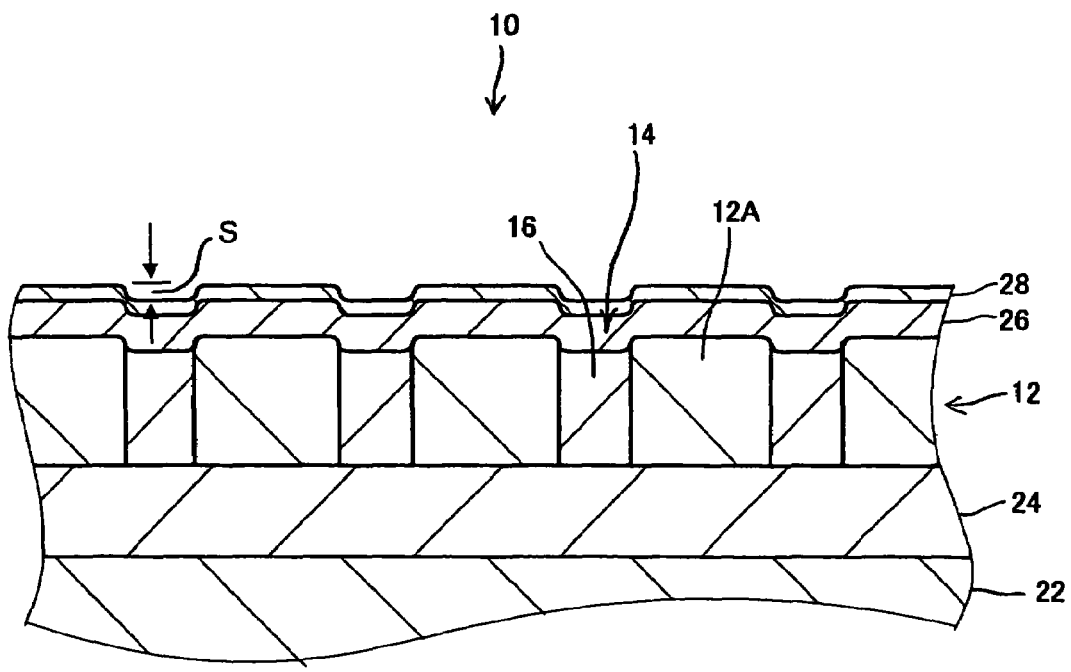
FIG. 2 is a schematic cross-sectional side view showing the structure of the magnetic recording medium under magnification.

Referring to FIG. 1, a magnetic recording medium 10 according to a first exemplary embodiment of the present invention is a perpendicular recording type of discrete track magnetic disk. In this medium 10, a recording layer 12 is formed in a concavo-convex pattern. Concave portions 14 of the concavo-convex pattern of the recording layer 12A are filled with a non-magnetic material 16, as shown in FIG. 2 under magnification. A concavo-convex ratio R obtained by dividing an area of convex portions in the surface by an area of concave portions in the surface, and a difference S in height between a concavity and a convexity of the surface satisfy a relationship of S≦3.6×R. Also, the arithmetical mean deviation of the assessed profile of the surface of the magnetic recording medium 10 is limited to 0.3 nm or more. The other structure is the same as that of a conventional magnetic recording medium so that the description thereof will be properly omitted.

In the magnetic recording medium 10, an underlayer 20, a soft magnetic layer 22, and a seed layer 24 are formed on a glass substrate 18 in this order. The recording layer 12 in the concavo-convex pattern is formed on the seed layer 24. A protective layer 26 and a lubricating layer 28 are formed on the recording layer 12 in this order.

The recording layer 12 having a thickness of 5 to 30 nm is made of a CoCr (cobalt-chromium) alloy. To be more specific, the recording layer 12 is divided into a number of recording elements 12A, and the recording elements 12A form only convex portions of the concavo-convex pattern. The recording elements 12A are concentrically formed in a radial direction of a track at minute intervals in a data region, and are formed by a pattern of predetermined servo information or the like in a servo region. The ratio of the convex portions to the concave portions in the concavo-convex pattern in the data region is approximately two to one in the radial direction (two for the convex portions and one for the concave portions). Thus, a concavo-convex ratio R in the whole surface of the magnetic recording medium 10 including the data regions and the servo regions is approximately 2.

The non-magnetic material 16 is made of $SiO_2$ (silicon dioxide). The convex portions of the concavo-convex pattern of the recording layer 12 are filled with the non-magnetic material 16. The top faces of the recording elements 12A protrude from the top faces of the non-magnetic material 16 in the direction of thickness.

The protective layer 26 having a thickness of 1 to 5 nm is made of a hard carbon film called diamond-like carbon. The term "diamond-like carbon (hereinafter called "DLC")" used herein shall refer to a material which is mainly composed of carbon, has an amorphous structure, and has a hardness of approximately 200 to 8000 $kgf/mm^2$ as measured by a Vickers hardness test. The lubricating layer 28 having a thickness of 1 to 2 nm is made of PFPE (perfluoropolyether).

In the magnetic recording medium 10, the surface of the lubricating layer 28 takes a concavo-convex shape to which the concavo-convex pattern of the recording layer 12 is reflected. As described above, the concavo-convex ratio R obtained by dividing the area of convex portions in the surface of the lubricating layer 28 by the area of concave portions in the surface thereof, and the difference S in height between a concavity and a convexity of the surface of the lubricating layer 28 satisfy a relationship of S≦3.6×R. Also, the arithmetical mean deviation of the assessed profile of the surface of the lubricating layer 28 is limited to 0.3 nm or more.

Then, the operation of the magnetic recording medium 10 will be described.

Figure 3:
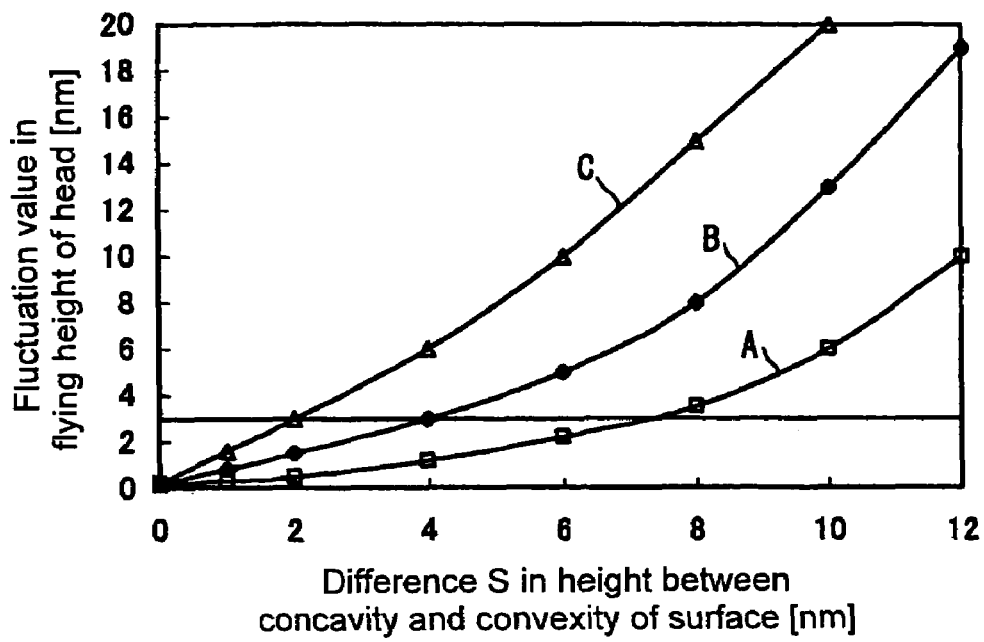
FIG. 3 is a graph which shows the relationship between the difference S in height between a concavity and a convexity of a surface and the fluctuation value in the flying height of a head, which is obtained by simulation on magnetic recording media according to first to third exemplary embodiments of the present invention, by use of a concavo-convex ratio R in the surface as a parameter.

When the concavo-convex ratio R is 2, a curve A in FIG. 3 represents the relationship between the difference S in height between a concavity and a convexity of the surface and the fluctuation value in the flying height of a head, which is obtained by simulation. The difference S in height between a concavity and a convexity of the surface of the magnetic recording medium 10, however, is limited to 7.2 nm (3.6×R) or less, so that the fluctuation value in the flying height of the head is restrained to 3 nm or less. Therefore, it is possible to obtain favorable recording and reproducing characteristics.

Figure 4:
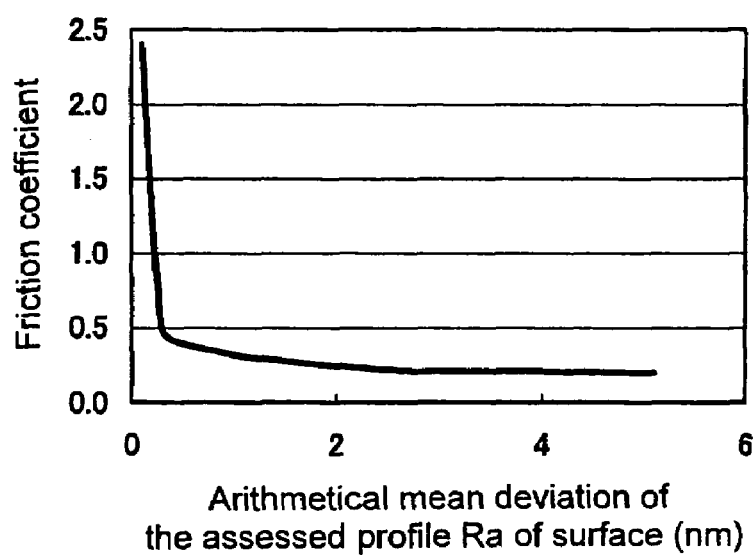
FIG. 4 is a graph showing the relationship between the arithmetical mean deviation of the assessed profile in the surface and the friction coefficient between the surface and the head, which is obtained by a slide test on the magnetic recording media according to first to third exemplary embodiments.

Referring to a graph of FIG. 4, when the arithmetical mean deviation of the assessed profile of the surface is excessively small, a friction coefficient between the surface and the head becomes excessively large, and hence the head tends to be adsorbed to the surface. In the magnetic recording medium 10, however, the arithmetical mean deviation of the assessed profile of the surface is 0.3 nm or more, so that the friction coefficient between the surface and the head is restrained to 0.5 or less. Therefore, it is possible to prevent the adsorption of the head.

In the magnetic recording medium 10, since information is recorded on the recording elements 12A composing the convex portions of the concavo-convex pattern, it is possible to restrain a side fringe, crosstalk, and the like between a recording element 12A and an adjacent recording element 12A thereto. Accordingly, it is possible to increase areal density.

Especially, the recording layer 12 is divided into the recording elements 12A, and the recording elements 12A form only the convex portions of the concavo-convex pattern, so that magnetic noise does not occur from the concave portions. Therefore, it is possible to improve recording and reproducing characteristics.

Since the top face of the recording layer 12 protrudes from the top face of the non-magnetic material 16 in the direction of thickness, spacing loss between the recording layer 12 and the head is reduced, as compared with the case where the top face of the non-magnetic material 16 protrudes from the top face of the recording layer 12 in the direction of thickness. Therefore, it is possible to improve the recording and reproducing characteristics in this respect.

In the magnetic recording medium 10, since the concave portions 14 between the recording elements 12 are filled with the non-magnetic material 16, it is possible to form the thick recording elements 12 while restraining the difference S in height between a concavity and a convexity of the surface. Therefore, the recording and reproducing characteristics are also improved in this respect.

Next, a second exemplary embodiment of the present invention will be described.

Figure 5:
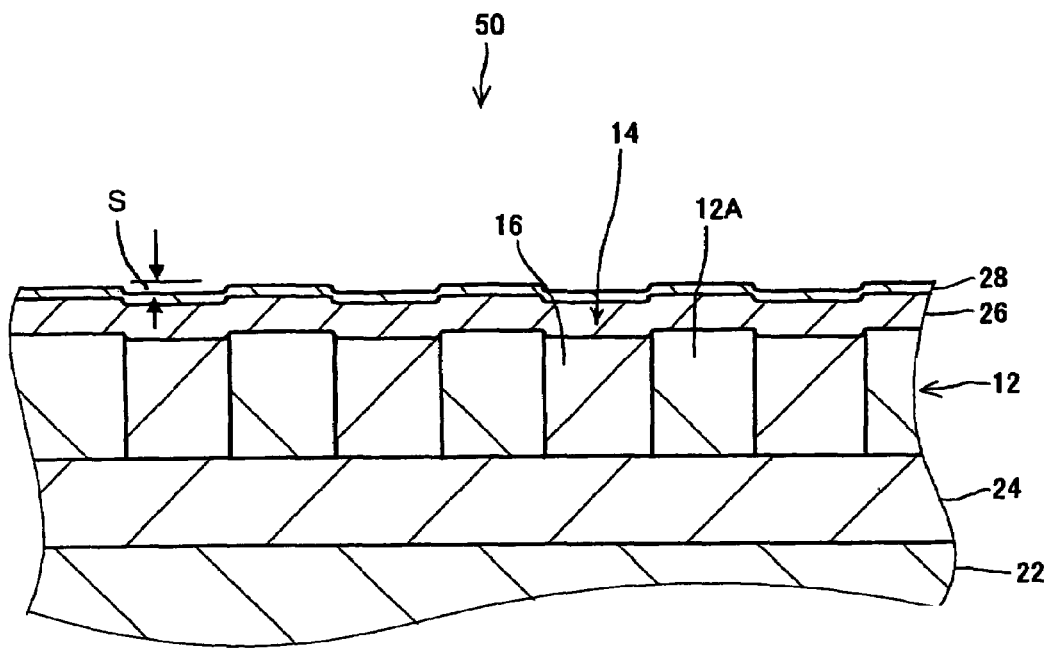
FIG. 5 is a schematic cross-sectional side view showing the structure of the magnetic recording medium according to the second exemplary embodiment of the present invention under magnification.

In a magnetic recording medium 50 according to the second exemplary embodiment of the present invention, as shown in FIG. 5, the ratio of convex portions to concave portions in a concavo-convex pattern in a data region is approximately one to one in a radial direction, in contrast to the magnetic recording medium 10 according to the foregoing first exemplary embodiment. Thus, a concavo-convex ratio R in the whole surface of the magnetic recording medium 50 including the data regions and servo regions is approximately 1, and the difference S in height between a concavity and a convexity of the surface is limited to 3.6 nm (3.6×R) or less. The other structure is the same as that of the magnetic recording medium 10 according to the foregoing first exemplary embodiment, so that the description thereof will be omitted.

In the magnetic recording medium 50, the ratio of the convex portions to the concave portions in the concavo-convex pattern in the data region is approximately one to one in the radial direction, and hence it is possible to form more recording elements per unit area. Therefore, it is possible to further increase areal density than the magnetic recording medium 10.

If the difference S in height between a concavity and a convexity of the surface is uniform, the fluctuation value in the flying height of a head tends to increase with decrease in the concavo-convex ratio R. When the concavo-convex ratio R is 1, a curve B in FIG. 3 represents the relationship between the difference S in height between a concavity and a convexity of the surface and the fluctuation value in the flying height of the head, which is obtained by simulation. The difference S in the height of concavo-convex of the surface is limited to 4.0 nm or less, so that the fluctuation value in the flying height of the head is restrained to 3 nm or less. Accordingly, it is possible to certainly restrain the fluctuation value in the flying height of the head to 3 nm or less by limiting the difference S in height between a concavity and a convexity of the surface to 3.6 nm (3.6×R) or less, and hence it is possible to obtain favorable recording and reproducing characteristics.

At the present time, a concavo-convex pattern in which the ratio of convex portions to concave portions in a data region is approximately two to one as with the magnetic recording medium 10 according to the first exemplary embodiment is regarded as the mainstream for that of discrete track media. In the future, it is assumed that the ratio of the convex portions to the concave portions in the data region becomes approximately one to one as with the magnetic recording medium 50 according to the second exemplary embodiment, and the concavo-convex ratio R of the whole surface of the magnetic recording medium 50 including the data regions and servo regions may be reduced to approximately 1. Accordingly, in a magnetic recording medium which has a recording layer in a concavo-convex pattern with a futuristic concavo-convex ratio R as in the case of the magnetic recording medium 50 according to the second exemplary embodiment, it is possible to restrain the fluctuation value of the flying height of a head to 3 nm or less by limiting the difference S in height between a concavity and a convexity of its surface to 3.6 nm or less. Therefore, it is possible to obtain favorable recording and reproducing characteristics.

Figure 6:
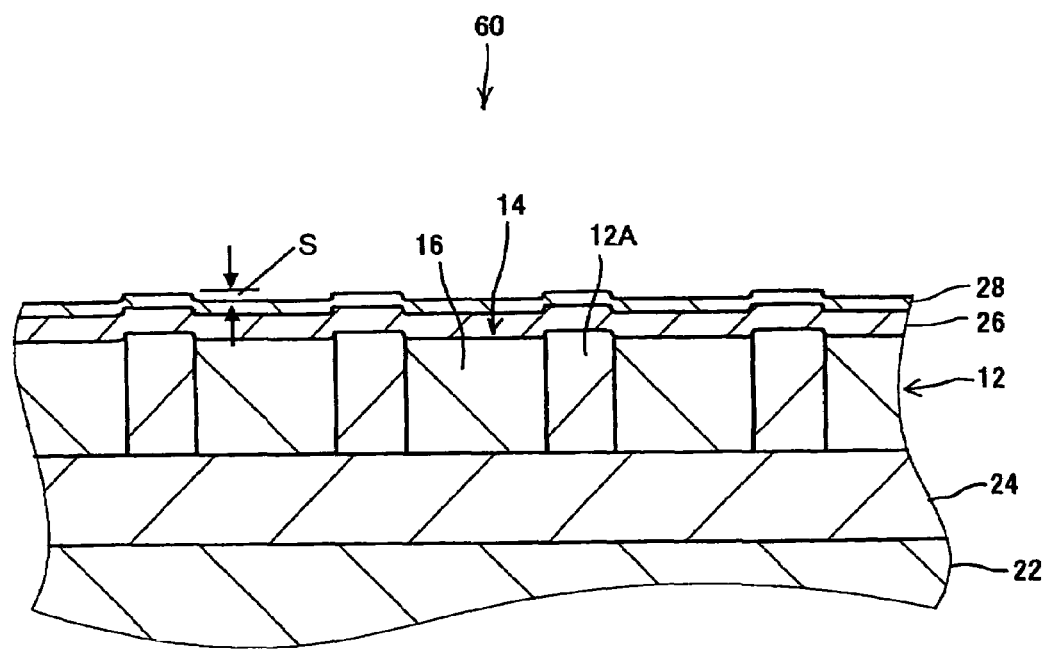
FIG. 6 is a schematic cross-sectional side view showing the structure of the magnetic recording medium according to the third exemplary embodiment of the present invention under magnification.

Furthermore, as with a magnetic recording medium 60 according to a third exemplary embodiment of the present invention shown in FIG. 6, the ratio of convex portions to concave portions in a data region may be approximately one to two (one for the convex portions and two for the concave portions), for the purpose of further increasing areal density and the like. The concavo-convex ratio R of the whole surface of the magnetic recording medium 60 including the data regions and servo regions may be reduced to approximately 0.5. When the concavo-convex ratio R is 0.5, a curve C in FIG. 3 represents the relationship between the difference S in height between a concavity and a convexity of the surface and the fluctuation value in the flying height of a head, which is obtained by simulation. The difference S in height between a concavity and a convexity of the surface is limited to 2.0 nm or less, so that the fluctuation value in the flying height of the head is restrained to 3 nm or less. Accordingly, with respect to a magnetic recording medium which has a recording layer in every concavo-convex pattern to be assumed, if the difference S in height between a concavity and a convexity of the surface is limited to 1.8 nm (3.6×R) or less, it is possible to certainly restrain the fluctuation value in the flying height of a head to 3 nm or less, and hence it is possible to obtain favorable recording and reproducing characteristics.

In the foregoing first to third exemplary embodiments, the arithmetical mean deviation of the assessed profile of the surface of the magnetic recording medium 10 is limited to 0.3 nm or more. It is preferable, however, to limit the arithmetical mean deviation of the assessed profile of the surface to 0.5 nm or more in order to further certainly prevent the adsorption of the head.

Figure 14:
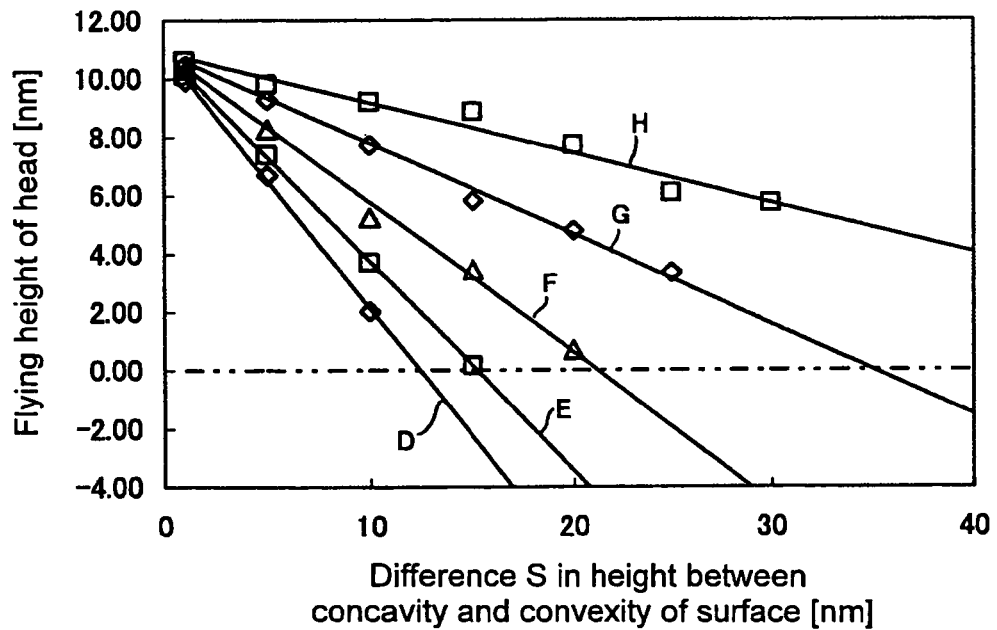
FIG. 14 is a graph which shows the relationship between the difference S in height between a concavity and a convexity of the surface and the flying height of the head, which is obtained by simulation on the magnetic recording media according to the first to third exemplary embodiments of the present invention, by use of the concavo-convex ratio R in the surface as a parameter.

In the foregoing first to third exemplary embodiments, the difference S in height between a concavity and a convexity of the surface is limited to 3.6×R nm or less. When the concavo-convex ratio R of the surface is 2, however, as shown by a line G in FIG. 14, the flying height of the head becomes 0 or more if the difference S in height between a concavity and a convexity of the surface is 37.1 (15.7×R+5.7) nm or less. When the concavo-convex ratio R of the surface is 1, as shown by a line F in FIG. 14, the flying height of the head becomes 0 or more if the difference S in height between a concavity and a convexity of the surface is 21.4 (15.7×R+5.7) nm or less. Similarly, when the concavo-convex ratio R of the surface is 0.5, as shown by a line E in the drawing, the flying height of the head becomes 0 or more if the difference S in height between a concavity and a convexity of the surface is 13.55 (15.7×R+5.7) nm or less. In other words, even if the difference S in height between a concavity and a convexity of the surface is larger than 3.6×R nm, limiting the difference S in height between a concavity and a convexity of the surface to 15.7×R+5.7 nm or less makes it possible to obtain the effect of preventing crash between the head and the magnetic recording medium. FIG. 14 will be described later on.

In the foregoing first to third exemplary embodiments, the recording layer 12 (continuous recording layer 72) is made of a CoCr alloy. The present invention, however, is applicable to the processing of a magnetic recording medium which is composed of recording elements made of another material such as, for example, another alloy including iron group elements (Co, Fe (iron), and Ni) and a layered product thereof.

In the foregoing first to third exemplary embodiments, the non-magnetic material 16 is made of $SiO_2$. The non-magnetic material 16 may be made of other oxides, nitrides such as TiN (titanium nitride), carbides such as SiC (silicon carbide) and TiC (titanium carbide), or other non-magnetic materials such as Ta (tantalum), TaSi, and Si. Each of such oxide, nitride, and carbide is superior in the chemical stability of itself, and is also resistant to degradation such as corrosion by contact with a magnetic material. Accordingly, it is possible to obtain favorable magnetic property.

In the foregoing first to third exemplary embodiments, the underlayer 20, the soft magnetic layer 22, and the seed layer 24 are formed under the continuous recording layer 72. The structure of layers under the continuous recording layer 72 is properly changeable in accordance with a type of magnetic recording medium. For example, one or two layers of the underlayer 20, the soft magnetic layer 22, and the seed layer 24 may be omitted. Otherwise, each layer may be composed of a plurality of layers. Otherwise, the continuous recording layer may be directly formed on a substrate.

In the foregoing first to third exemplary embodiments, the magnetic recording medium 10 is a perpendicular recording discrete magnetic disk, in which the recording elements 12A are arranged in parallel in the radial direction of the track at the minute intervals in the data region. The present invention, as a matter of course, is applicable to a magnetic disk in which recording elements are arranged in parallel in a peripheral direction of a track (in the direction of a sector) at minute intervals, a magnetic disk in which recording elements are arranged in parallel in both of a radial direction and a peripheral direction of a track at minute intervals, a PERM (pre-embossed recording medium) type of magnetic disk having a continuous recording layer formed in a concavo-convex pattern, and a magnetic disk in which a track is formed into a spiral shape. The present invention is also applicable to a longitudinal recording magnetic disk. By applying the present invention to a magneto-optical disk such as an MO, and a thermal assisted magnetic disk using both of magnetism and heat, it is possible to stabilize the flying characteristics of a head and improve recording and reproducing characteristics.

Figure 7:
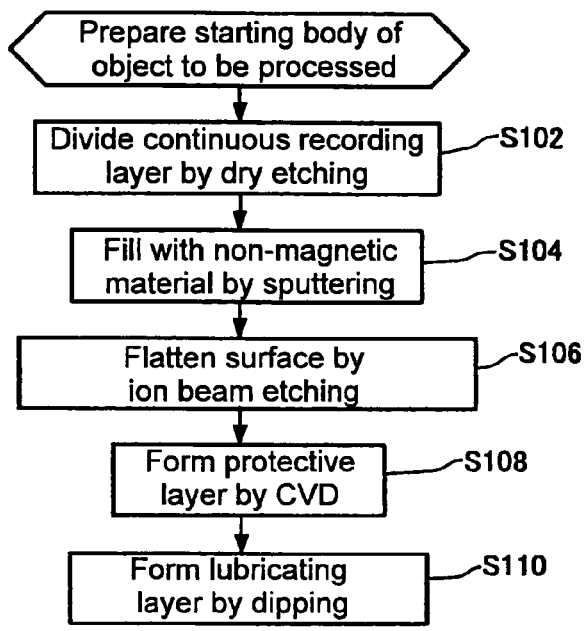
FIG. 7 is a flowchart showing an overview of a manufacturing process of the magnetic recording medium according to the first exemplary embodiment.

Next, a method for manufacturing the magnetic recording medium 10 will be briefly described with reference to a flowchart of FIG. 7.

Figure 8:
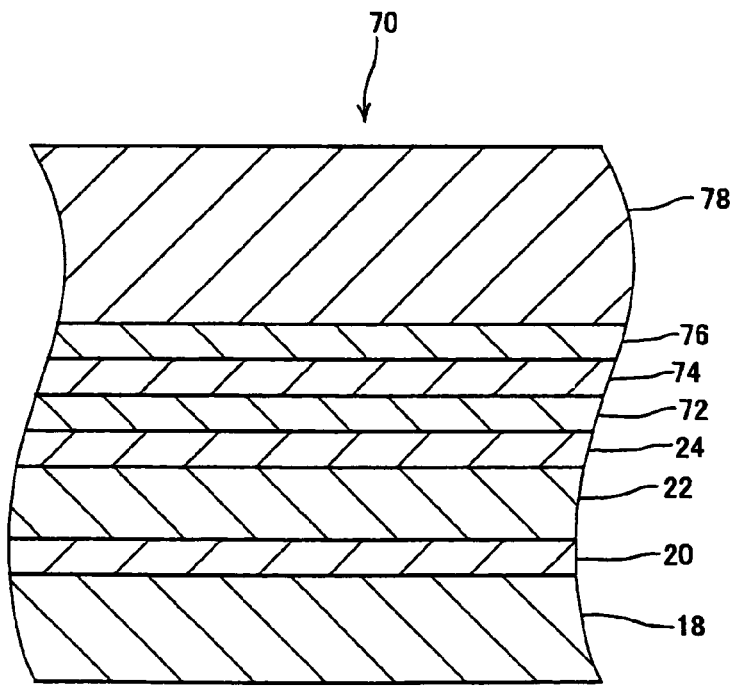
FIG. 8 is a schematic cross-sectional side view showing the structure of a starting body in the manufacturing process of the magnetic recording medium.
Figure 9:
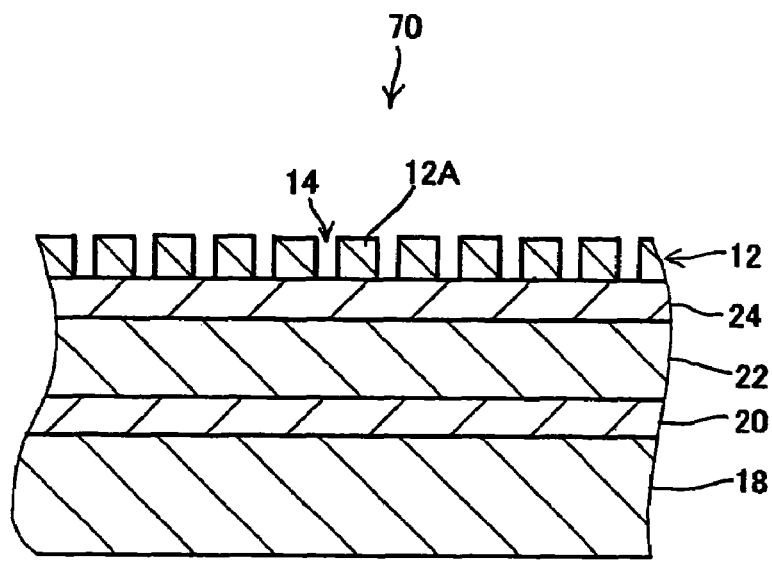
FIG. 9 is a schematic cross-sectional side view showing the shape of an object to be processed during the manufacturing process of the magnetic recording medium, on the surface of which recording elements are formed.

First, by processing a starting body of an object to be processed 70 shown in FIG. 8, a continuous recording layer 72 is divided into the recording elements 12A to form the recording layer 12 as shown in FIG. 9 (S102).

To concretely obtain the starting body of the object to be processed 70, the underlayer 20, the soft magnetic material 22, the seed layer 24, the continuous recording layer 72, a first mask layer 74, and a second mask layer 76 are formed on the glass substrate 18 in this order by sputtering. Then, a resist layer 78 is applied by spin coating. Otherwise, the resist layer 78 may be applied by dipping. The first mask layer 74 is made of, for example, TiN (titanium nitride), and the second mask layer 76 is made of, for example, Ni (nickel).

A predetermined servo pattern including contact holes is transferred to the servo region of the resist layer 78 of the starting body of the object to be processed 70, and the concavo-convex pattern is transferred to the data region thereof in the radial direction at minute intervals by nanoimprinting by use of a transfer device (not illustrated). Then, the resist layer 78 in the bottom of the concave portions of the concavo-convex pattern is removed by reactive ion etching using $O_2$ gas as the reactive gas. Otherwise, the resist layer 78 may be processed into the concavo-convex pattern by exposure and development.

Then, the second mask layer 76 in the bottom of the concave portions is removed by ion beam etching using Ar (argon) gas, and the first mask layer 74 in the bottom of the concave portions is removed by reactive ion etching using $SF_6$ (sulfur hexafluoride) gas. Thus, the continuous recording layer 72 is exposed at the bottom of the concave portions. Then, the continuous recording layer 72 in the bottom of the concave portions is removed by reactive ion etching with using CO gas and $NH_3$ gas as the reactive gases. Accordingly, the continuous recording layer 72 is divided into a number of recording elements 12A, and the recording layer 12 is formed. Then, the first mask layer 74 remaining on the top faces of the recording elements 12A is completely removed by reactive ion etching using $SF_6$ gas as the reactive gas, and hence the object to be processed 70 as shown in FIG. 9, in which the recording layer 12 in the concavo-convex pattern is formed in its surface, is obtained.

Figure 10:
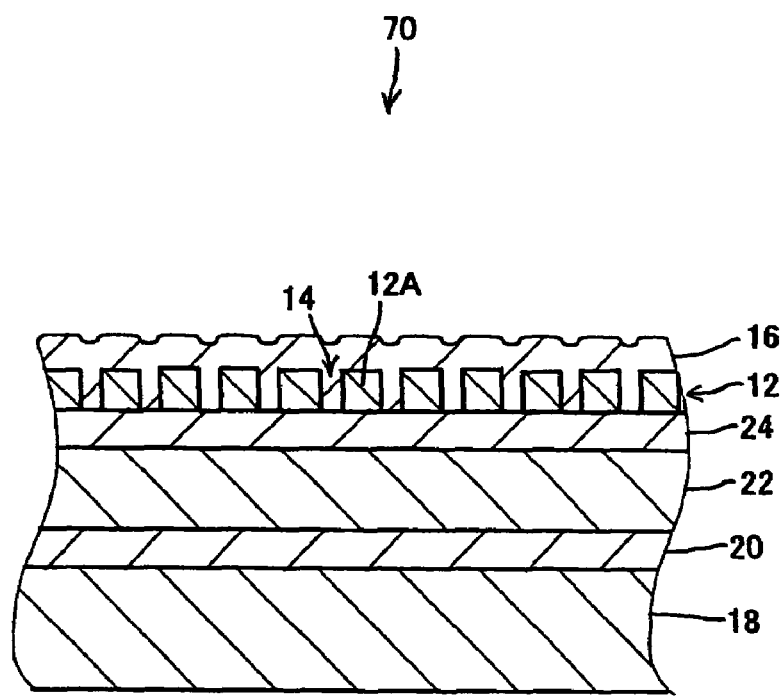
FIG. 10 is a cross-sectional side view showing the shape of the object to be processed in which a non-magnetic material is deposited over the recording elements and concave portions are filled with the non-magnetic material.

Then, as shown in FIG. 10, particles of $SiO_2$ (non-magnetic material 16) are deposited over the surface of the object to be processed 70 by bias sputtering while applying bias power to the object to be processed 70, in order to fill the concave portions 14 between the recording elements 12A with the non-magnetic material 16 (S104). The non-magnetic material 16 is deposited so as to completely cover the recording elements 12A.

At this time, since a sputtering gas such as Ar collides with a target of $SiO_2$, the particles of $SiO_2$ scatter and tend to be uniformly deposited over the surface of the object to be processed 70 in accordance with the concavo-convex shape of the recording elements. Therefore, the surface of the non-magnetic material 16 tends to be in the concavo-convex shape.

By applying the bias power to the object to be processed 70, on the other hand, the sputtering gas biased in the direction of the object to be processed 70 collides with the deposited $SiO_2$, and etches part of the deposited $SiO_2$. This etching operation tends to selectively remove a protruding portion of the deposited $SiO_2$ quicker than the other portions, so that concavities and convexities at the surface of the non-magnetic material 16 are gradually flattened. These functions advance at the same time in practice. Since a deposit function exceeds an etching function, the deposit of the non-magnetic material 16 advances while restraining the concavities and convexities at the surface.

Accordingly, as shown in FIG. 10, the non-magnetic material 16 is deposited into the shape of restraining the concavities and convexities at the surface. Since the non-magnetic material 16 is made of $SiO_2$, the non-magnetic material 16 is in a microcrystalline state in which grain growth is restrained. By selecting deposit conditions, the non-magnetic material 16 may have an amorphous structure. Such a non-magnetic material in a microcrystalline state or amorphous structure is superior in adhesion to the recording element 12A made of a magnetic material. The side faces of the recording elements 12A tend to be damaged by processing, and hence a defect such as a grain boundary tends to occur. The non-magnetic material in the microcrystalline state or the amorphous structure tightly adheres to the recording elements 12A, so that it is possible to obtain the effect of improving such a defect.

Figure 11:
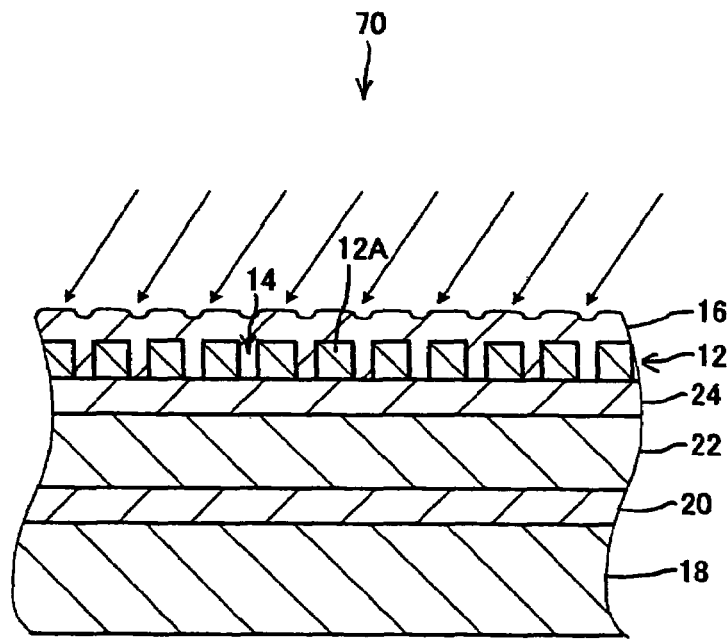
FIG. 11 is a schematic cross-sectional side view showing a flattening process of the object to be processed.
Figure 12:
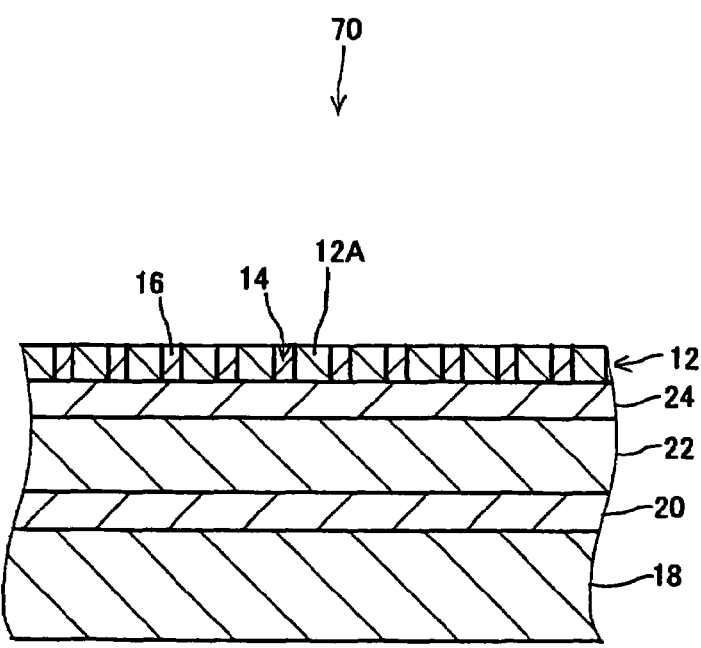
FIG. 12 is a schematic cross-sectional side view showing the shape of the object to be processed after the flattening process.

Then, as shown in FIG. 11, the non-magnetic material 16 is removed up to the top faces of the recording elements 12A by use of ion beam etching, to flatten the surfaces of the recording elements 12A and the non-magnetic material 16 as shown in FIG. 12 (S106). The term "ion beam etching" used herein shall refer to a generic name of a processing method such as ion milling, in which an ionized gas is applied to an object to be processed to remove a processed material. In this embodiment, Ar gas is used as a processing gas of the ion beam etching, and the incident angle of an ion beam is limited within the range between 50 and 60 degrees, to remove the non-magnetic material 16 up to the top faces of the recording elements 12A. The term "incident angle" used herein shall refer to an angle at which an ion beam is incident upon the surface of the object to be processed, and an angle which the surface of the object to be processed forms with the central axis of the ion beam. For example, when the central axis of the ion beam is in parallel with the surface of the object to be processed, the incident angle is 0 degree. When the central axis of the ion beam is orthogonal to the surface of the object to be processed, the incident angle is +90 degrees. Inclining the incident angle of the ion beam with respect to a direction orthogonal to the surface, as described above, makes it possible to increase the effect of flattening the concavities and convexities. In other words, the concavo-convex shape to which the concavo-convex pattern of the recording layer 12 is reflected is flattened. A concavo-convex shape which follows the concavo-convex pattern of the recording layer 12 is formed over the top faces of the recording elements 12A and the non-magnetic material 16, as shown in FIG. 12, in such a manner that the concavo-convex ratio R and the difference S in height between a concavity and a convexity satisfy the relationship of $S \leq 3.6 \times R$.

Furthermore, the etching rate of the $SiO_2$ (non-magnetic material 16) becomes approximately equal to the etching rate of the CoCr alloy (recording layer 12) by limiting the incident angle of the ion beam within the foregoing range. Accordingly, if part of the recording element 12A is removed together with the non-magnetic material 16 after the non-magnetic material 16 over the recording elements 12A is removed, the difference S in height between a concavity and a convexity of the surface does not increase. The term "etching rate" used herein shall refer to the amount of processing by etching per unit of time.

Since the bias power is applied during a non-magnetic material filling process (S104), the non-magnetic material 16 is deposited in such a manner as to restrain concavities and convexities at its surface. Therefore, it is easy to flatten the surface.

Etching conditions such as the incident angle of the ion beam are adjusted so as to make the etching rate of the CoCr alloy (recording layer 12) slightly lower than that of the $SiO_2$ (non-magnetic material 16). Thus, it is possible to protrude the surface of the recording layer 12 from the surface of the non-magnetic material 16 in the direction of thickness.

Then, the protective layer 26 is formed on the top faces of the recording elements 12A and the non-magnetic material 16 by a CVD (chemical vapor deposition) method (S108). Furthermore, the lubricating layer 28 is applied on the protective layer 26 by dipping (S110). Thus, the magnetic recording medium 10 as shown in FIGS. 1 and 2 is completed.

As described above, the non-magnetic material 16 is deposited with restraining the concavities and convexities at the surface by applying the bias power. Furthermore, the incident angle of the ion beam is limited so as to approximately equalize the etching rate of the recording elements 12A with that of the non-magnetic material 16 in the ion beam etching. Accordingly, it is possible to form the concavo-convex shape following the concavo-convex pattern of the recording layer 12 in the top face, in such a manner that the concavo-convex ratio R of the surface and the difference S in height between a concavity and a convexity of the surface satisfy the relationship of $S \leq 3.6 \times R$. Thus, it is also possible to form the surface of the lubricating layer 28 into a similar shape.

SIMULATION EXAMPLE 1

A plurality of simulation models of magnetic recording media were formed while varying the concavo-convex ratio R of the surface and the difference S in height between a concavity and a convexity of the surface, in order to calculate the fluctuation value in the flying height of the head. Simulation conditions were set so that an average value of the flying height of the head always became 10 nm. As in the case of the foregoing first to third exemplary embodiments, there were three types of concavo-convex ratio R of the surface, that is, 2, 1, and 0.5. Table 1 shows the results of simulation. FIG. 3 described above presents the simulation results of Table 1 in a graphical form.

TABLE 1

| Difference S in height between concavity and convexity of surface (nm) | Fluctuation value in flying height of head (nm) | | |
|---|---|---|---|
| | Concavo-convex ratio R of surface | | |
| | R = 0.5 | R = 1 | R = 2 |
| 0 | 0.2 | 0.2 | 0.2 |
| 1 | 1.6 | 0.8 | 0.3 |
| 2 | 3.0 | 1.5 | 0.5 |
| 4 | 6.0 | 3.0 | 1.2 |
| 6 | 10.0 | 5.0 | 2.2 |
| 8 | 15.0 | 8.0 | 3.5 |
| 10 | 20.0 | 13.0 | 6.0 |
| 12 | — | 19.0 | 10.0 |

Figure 13:
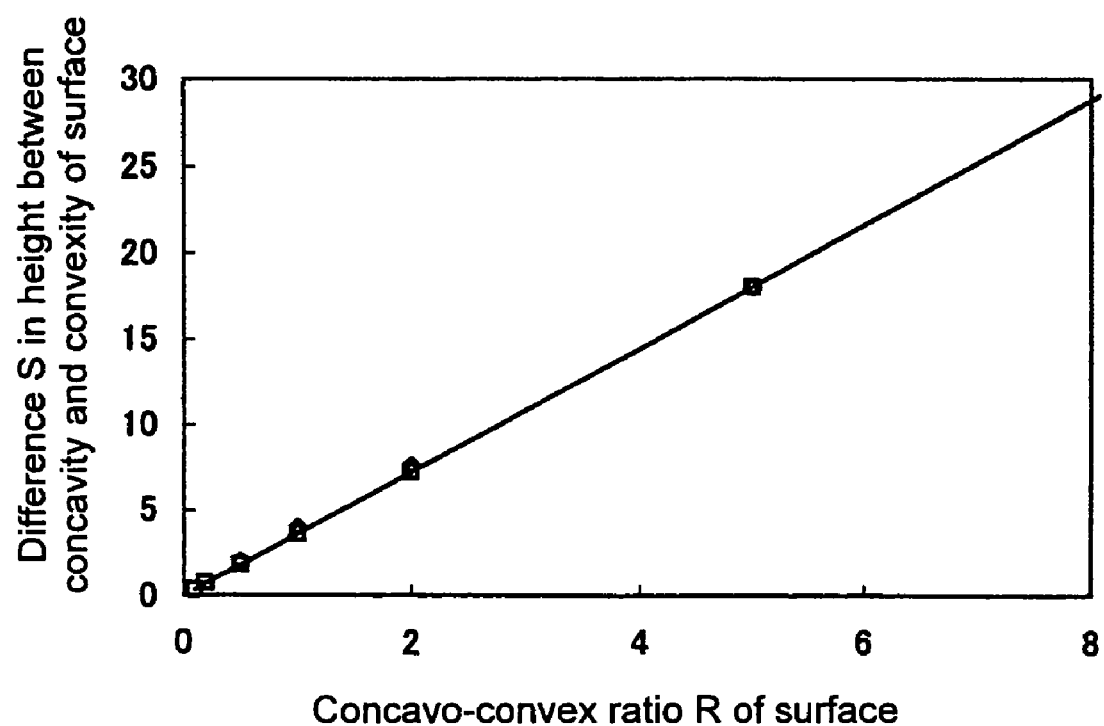
FIG. 13 is a graph showing the relationship between the concavo-convex ratio R in the surface and the difference S in height between a concavity and a convexity of the surface, in the case where the flying fluctuation of the head is 3 nm.

FIG. 13 is a graph which shows the relationship between the concavo-convex ratio R of the surface and the difference S in height between a concavity and a convexity of the surface, when the fluctuation value in the flying height of the head is 3 nm. When $S \cong 3.6 \times R$ holds, the fluctuation value in the flying height of the head becomes 3 nm. Accordingly, it is found out that the fluctuation value in the flying height of the head can be limited to 3 nm or less by satisfying $S \leq 3.6 \times R$.

SIMULATION EXAMPLE 2

A plurality of simulation models of magnetic recording media were formed, as in the case of the simulation example 1, while varying the concavo-convex ratio R of the surface and the difference S in height between a concavity and a convexity of the surface, in order to calculate the fluctuation value in the flying height of the head. Simulation conditions were set so that the flying height of the head became 10 nm when the surface of the magnetic recording media was flat without concavities and convexities. There were five types of concavo-convex ratio R of the surface by adding 0.2 and 5 to 2, 1, and 0.5 according to the foregoing first to third exemplary embodiments. FIG. 14 shows the simulation results of the flying height of the head. The flying height of the head is a height from the top face of the convex portion of the surface to the lower face of the head. In FIG. 14, a line D represents the case where the concavo-convex ratio R is 0.2, a line E represents the case where the concavo-convex ratio R is 0.5, a line F represents the case where the concavo-convex ratio R is 1.0, a line G represents the case where the concavo-convex ratio R is 2, and a line H represents the case where the concavo-convex ratio R is 5.

It is apparent from FIG. 14 that when the concavo-convex ratio R of the surface is 2 or more, it is possible to prevent the crash between the head and the magnetic recording medium by limiting the difference S in height between a concavity and a convexity of the surface to 37.1 (15.7×R+5.7) nm or less.

When the concavo-convex ratio R of the surface is 1 or more, it is possible to prevent the crash between the head and the magnetic recording medium by limiting the difference S in height between a concavity and a convexity of the surface to 21.4 (15.7×R+5.7) nm or less.

When the concavo-convex ratio R of the surface is 0.5 or more, it is possible to prevent the crash between the head and the magnetic recording medium by limiting the difference S in height between a concavity and a convexity of the surface to 15 nm or less, and it is possible to certainly prevent the crash between the head and the magnetic recording medium by limiting the difference S in height between a concavity and a convexity of the surface to 13.55 (15.7×R+5.7) nm or less.

When the concavo-convex ratio R of the surface is 0.2 or more, it is possible to prevent the crash between the head and the magnetic recording medium by limiting the difference S in height between a concavity and a convexity of the surface to 12 nm or less, and it is possible to certainly prevent the crash between the head and the magnetic recording medium by limiting the difference S in height between a concavity and a convexity of the surface to 8.84 (15.7×R+5.7) nm or less.

Figure 15:
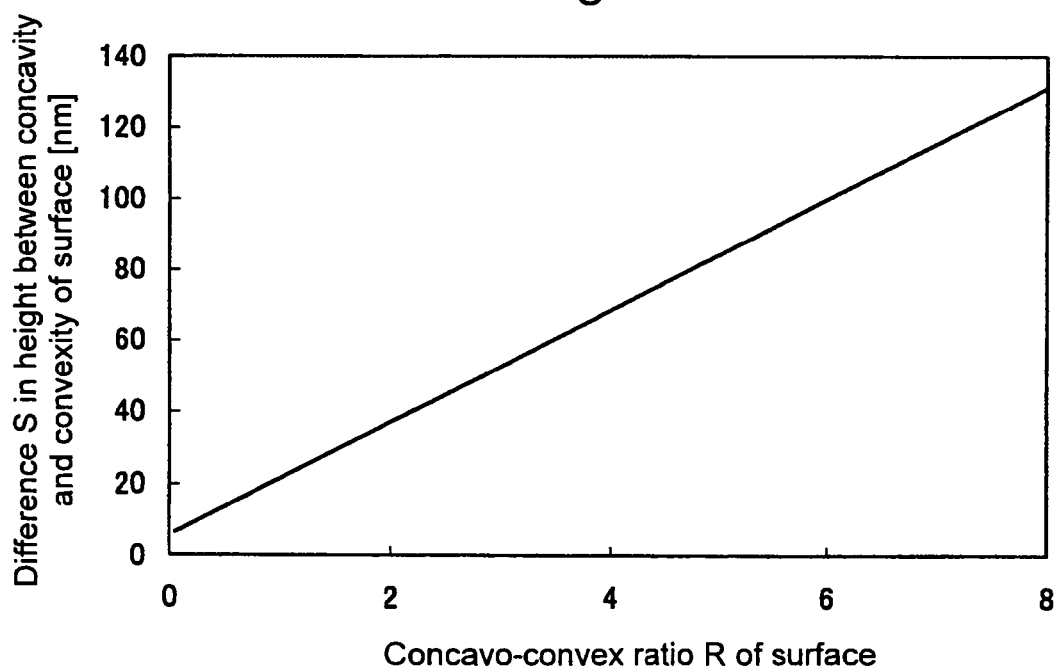
FIG. 15 is a graph showing the relationship between the concavo-convex ratio R in the surface and the difference S in height between a concavity and a convexity of the surface, in the case where the flying height of the head is zero.

FIG. 15 shows the relationship between the concavo-convex ratio R of the surface and the difference S in height between a concavity and a convexity of the surface, when the flying height of the head is 0. It is apparent from FIG. 15 that the flying height of the head becomes 0, when S=15.7×R+5.7 holds. It is possible to prevent the crash between the head and the magnetic recording medium by satisfying S≦15.7×R+5.7.

In other words, if the concavo-convex pattern of the surface is so formed that the concavo-convex ratio R of the surface and the difference S in height between a concavity and a convexity of the surface satisfy the relationship of S≦15.7×R+5.7, it is possible to carry out recording and reproduction while preventing the crash between the head and the magnetic recording medium. Furthermore, forming the concavo-convex pattern of the surface so as to satisfy the relationship of S≦3.6×R makes it possible to obtain favorable recording and reproducing characteristics.

To be more specific, when the concavo-convex ratio R of the whole surface of the magnetic recording medium including the data regions and the servo regions is equal to or more than 2, and smaller than 5, it is possible to prevent the crash between the head and the magnetic recording medium by limiting the difference S in height between a concavity and a convexity of the surface to 37.1 (15.7×2+5.7) nm or less, and it is possible to restrain the fluctuation value in the flying height of the head to 3 nm or less by limiting the difference S in height between a concavity and a convexity of the surface to 7.2 (3.6×2) nm or less. Therefore, it is possible to obtain favorable recording and reproducing characteristics.

When the concavo-convex ratio R of the whole surface of the magnetic recording medium including the data regions and the servo regions is equal to or more than 1, and smaller than 2, it is possible to prevent the crash between the head and the magnetic recording medium by limiting the difference S in height between a concavity and a convexity of the surface to 21.4 (15.7×1+5.7) nm or less. It is possible to restrain the fluctuation value in the flying height of the head to 3 nm or less by limiting the difference S in height between a concavity and a convexity of the surface to 3.6 (3.6×1) nm or less, and hence it is possible to obtain favorable recording and reproducing characteristics.

When the concavo-convex ratio R of the whole surface of the magnetic recording medium including the data regions and the servo regions is equal to or more than 0.5, and smaller than 1, it is possible to prevent the crash between the head and the magnetic recording medium by limiting the difference S in height between a concavity and a convexity of the surface to 13.55 (15.7×0.5+5.7) nm or less. It is possible to restrain the fluctuation value in the flying height of the head to 3 nm or less by limiting the difference S in height between a concavity and a convexity of the surface to 1.8 (3.6×0.5) nm or less, and hence it is possible to obtain favorable recording and reproducing characteristics.

When the concavo-convex ratio R of the whole surface of the magnetic recording medium including the data regions and the servo regions is equal to or more than 0.2, and smaller than 0.5, it is possible to prevent the crash between the head and the magnetic recording medium by limiting the difference S in height between a concavity and a convexity of the surface to 12.0 nm or less, and it is possible to certainly prevent the crash between the head and the magnetic recording medium by limiting the difference S in height between a concavity and a convexity of the surface to 8.84 (15.7×0.2+5.7) nm or less. It is possible to restrain the fluctuation value in the flying height of the head to 3 nm or less by limiting the difference S in height between a concavity and a convexity of the surface to 0.72 (3.6×0.2) nm or less, and hence it is possible to obtain favorable recording and reproducing characteristics.

The present invention is applicable to a magnetic recording medium such as, for example, a discrete track medium and a patterned medium in which a recording layer is formed into a concavo-convex pattern.

What is claimed is:

1. A magnetic recording medium comprising:
    a substrate; and
    a recording layer formed in a predetermined concavo-convex pattern over the substrate,
    wherein a surface of the magnetic recording medium has a concavo-convex shape that conforms with the concavo-convex pattern of the recording layer in a convex and concave positional relation, convex portions of the concavo-convex shape of the surface being formed over convex portions of the concavo-convex pattern of the recording layer, and
    R representing a concavo-convex ratio obtained by dividing an area of the convex portions of the surface by an area of concave portions of the surface, and S representing a difference in height between a concavity and a convexity of the surface satisfy the following relationship:

$S(nm) \leq 3.6 \times R$, and $0.5 \leq R \leq 2.0$.

2. The magnetic recording medium according to claim 1, wherein
    an arithmetical mean deviation of an assessed profile of the surface is limited to 0.3 nm or more.

3. The magnetic recording medium according to claim 1, wherein
    concave portions of the concavo-convex pattern of the recording layer are filled with a non-magnetic material.

4. The magnetic recording medium according to claim 1, wherein
    the surface of the recording layer protrudes from the surface of the non-magnetic material in a direction of thickness.

* * * * *